Sept. 9, 1924.
E. T. FOOTE
1,508,138
CONTROLLER FOR MOTOR OPERATED VALVES
Filed March 8, 1920
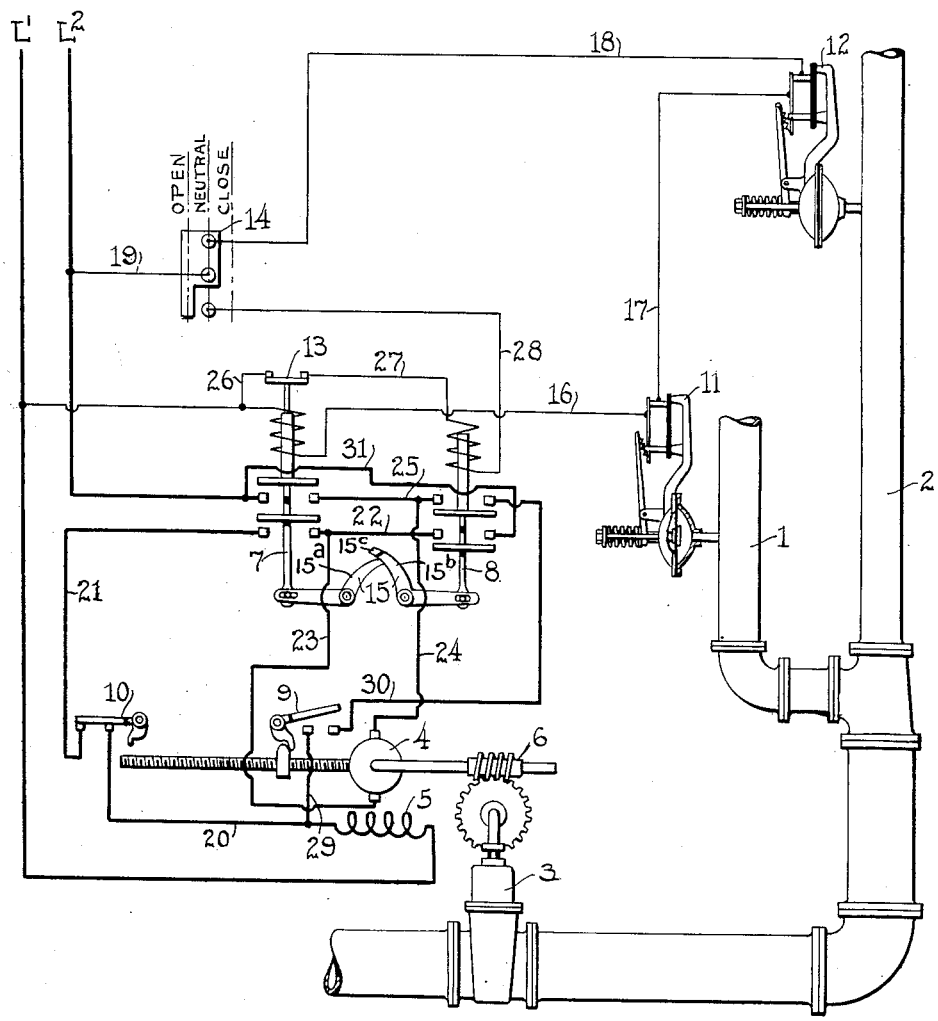
INVENTOR.
Edward T. Foote
BY Frank A. Hubbard
ATTORNEY Patented Sept. 9, 1924.

1,508,138

UNITED STATES PATENT OFFICE.

EDWARD T. FOOTE, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLER FOR MOTOR-OPERATED VALVES.

Application filed March 8, 1920. Serial No. 364,116.

*To all whom it may concern:*

Be it known that I, EDWARD T. FOOTE, a citizen of the United States, residing at Milwaukee, in the county of Milwaukee and State of Wisconsin, have invented new and useful Improvements in Controllers for Motor-Operated Valves, of which the following is a full, clear, concise, and exact description, reference being had to the accompanying drawing, forming a part of this specification.

This invention relates to controllers for motor operated valves, and is particularly applicable to valves utilized in systems of water distribution.

An object of the invention is that of providing for valves utilized in the foregoing and other systems a controller adapted to effect a given operation of the valve automatically under predetermined abnormal conditions of the system.

Another object is that of providing a controller of the aforesaid character adapted to effect automatically a given operation of the valve under predetermined conditions of derangement of the controller.

Another object is that of providing a controller of the character stated adapted under normal conditions to voluntary actuation for effecting opening, closing or intermediate positioning of the valve while providing against improper operation of the valve under predetermined abnormal conditions.

Other objects and advantages will hereinafter appear.

The accompanying drawing illustrates schematically and diagrammatically one of the embodiments which the invention may assume in practice.

Referring to the drawing, the same illustrates a simplified conduit system having branches 1 and 2 and adapted to be supplied with water or other fluid under substantial pressure through a valve 3. A reversible motor 4 having a series field 5 is adapted by means of suitable gearing 6 to drive said valve in opposite directions selectively for effecting closing, opening or intermediate positioning thereof. Electromagnetically operated reversing switches 7 and 8 serve selectively to connect the motor and field across supply lines L', L² in reverse relations for operation in opposite directions respectively while limit switches 9 and 10 serve selectively to arrest operation of the motor in either direction and also serve in conjunction with the reversing switches to prevent restarting thereof in such direction prior to predetermined operation in the opposite direction.

Pressure responsive switches 11 and 12 serve to control the continuity of the energizing circuit of switch 7, said last mentioned switch also serving by means of auxiliary contacts 13 to control the energizing circuit of reversing switch 8. The energizing circuits of said reversing switches are furthermore subjected to voluntary selective control by a master controller 14 while a mechanical interlock 15 serves to prevent closure of either of said switches so long as the other remains closed. As shown in the drawing interlock 15 includes arms 15$^a$ and 15$^b$ connected to switches 7 and 8 respectively. Arm 15$^b$ is provided with a projecting lug 15$^c$ and upon closure of switch 8 said lug moves into the path of the arm 15$^a$ to prevent closure of switch 7 while upon closure of switch 7 the end of arm 15$^a$ moves into the path of said lug to prevent closure of switch 8.

More specifically, switch 7, which is assumed to control the valve closing operation of the motor, is biased by gravity to motor energizing position whereby during inaction of the motor or during valve opening action thereof said switch must be held open electromagnetically through energization of its winding. The pressure responsive switches 11 and 12 are arranged in series in the energizing circuit of said winding and are adapted to maintain their contacts closed so long as the fluid pressure in their respective conduit branches exceeds a predetermined minimum value.

Said holding circuit of valve closing switch 7 also extends through the master controller 14 which is adapted to assume extreme positions for effecting valve closing and valve opening energization of the motor through the reversing switches selectively, and an intermediate neutral position wherein the motor is de-energized. Said controller is moreover adapted when in either valve opening or neutral position to maintain continuity of said holding circuit and when moved to its valve closing position to interrupt said circuit.

Reversing switch 8, which controls the valve opening operation of the motor, is on the other hand, gravity biased to open position and is closable electromagnetically only by movement of the master controller to its valve opening position while the reversing switch 7 is maintained open.

The various parts being in the relative positions illustrated, failure of pressure in either of the branches 1 and 2 due to rupture of the conduit or other cause, permits its associated pressure responsive switch to open thereby interrupting the energizing circuit of reversing switch 7 which circuit normally extends from line L' through the winding of said switch, by conductor 16 through pressure responsive switch 11, thence by conductor 17 through pressure responsive switch 12, by conductor 18 through the master controller and by conductor 19 to line $L^2$. Upon deenergization of said circuit, said reversing switch 7 is adapted to close under its bias, thus completing the motor circuit for effecting closure of valve 3, said circuit extending from line L' through series field 5, thence by conductor 20 through limit switch 10, by conductor 21 through the lower down contacts of said reversing switch 7, thence by conductors 22 and 23 through the motor from left to right, by conductors 24 and 25 through the upper contacts of said reversing switch 7 and thence to line $L^2$. The motor thereupon functions for closing the valve and releasing limit switch 9 which thereupon closes, and at the end of the valve closing operation, limit switch 10 is opened thereby interrupting the motor circuit and also providing against reclosure of said circuit by means of said reversing switch except following prior operation of the motor in the opposite direction.

Obviously movement of the master controller to valve closing position serves similarly to interrupt the holding circuit of said reversing switch with results as aforedescribed, whereas the valve 3 will also be closed automatically upon any derangement of the controller which results in interruption of said holding circuit, assuming the power circuits to be unaffected.

Closure of reversing switch 7 also serves through opening of its auxiliary up contacts 13 and through action of the mechanical interlock 15 to prevent closure of reversing switch 8 until said former reversing switch is re-opened and held open. Therefore following automatic closure of said former reversing switch and functioning of the motor to close the valve due to any of the abnormal conditions stated, no further energization of the motor can be effected by means of the controller prior to such repair or restoration of the service as results in continuous energization of the holding winding of said reversing switch 7. The controller thus provides against reopening of the valve while an appreciable leak exists in the conduit system or if the controller itself is not in condition to effect its intended automatic functions.

However, assuming closure of the valve in response to actuation of the master controller, said valve may be reopened through movement of the master controller to its opening position. In so moving the master controller passes through its neutral position and picks up said reversing switch 7 with consequent closure of its up contacts 13 and upon full movement of the master controller the energizing circuit of reversing switch 8 is completed, said circuit extending from line L' by conductor 26 through said up contacts 13 of reversing switch 7 thence by conductor 27 through the winding of reversing switch 8, thence by conductor 28 through the master controller to line $L^2$. Reversing switch 8 thereupon closes for effecting valve opening circuit connection of the motor, the circuit of the latter thereafter extending from line L' through the series field as formerly traced, thence by conductor 29 through limit switch 9, by conductor 30 through the upper contacts of reversing switch 8, thence by conductors 25 and 24 through the motor from right to left, by conductors 23 and 22 through the lower contacts of said reversing switch 8 and thence by conductor 31 to line $L^2$. The motor thereupon operates in a direction opposite to that aforedescribed for effecting opening of the valve, and upon completion of such action limit switch 9 is operated for de-energization of the motor circuit, while at an earlier stage the limit switch 10 is permitted to close, thus providing for subsequent restarting of the motor in the opposite direction to effect closure of the valve under any of the conditions aforedescribed.

Obviously voluntarily controlled movement of the valve may be arrested at any desired intermediate stage by movement of the master controller to neutral position. Also since in each instance the open limit switch is permitted to close prior to opening of the closed limit switch, the master controller may be utilized for inching in either direction to effect finer intermediate settings of the valve.

The limit switches serve in conjunction with the reversing switches to prevent energization of the motor in a sense tending to cause over-travel of the valve, whereas the mechanical interlock 15 serves positively to prevent closure of either of the reversing switches so long as the other is in closed position irrespective of operation of the master controller tending to effect such result.

What I claim as new and desire to secure by Letters Patent is:

1. In a controller for a valve to be utilized in a water distribution system or the like, the combination with an operating motor for said valve, of a pair of electro-responsive switches adapted to effect line connections for said motor for operation in reverse directions respectively, manual control means for said switches, means for effecting operation of one of said switches independently of said manual means, and associated means adapted upon said independent operation of said switch to render said manual control means ineffective for control of the other switch pending restoration of said independently operated switch to its former condition.

2. In a controller for a valve to be utilized in a water distribution system or the like, the combination with an operating motor for said valve, of a pair of electro-magnetically operated switches adapted to effect line connections for the motor for operation in reverse directions respectively, one of said switches being adapted to control the energizing circuit of the other, manual control means for said switches and a control device for said former switch operable automatically under predetermined pressure conditions in said system to provide for motor actuation of said valve in a given direction and to render said manual control means ineffective pending resetting of said device.

3. In a reversing controller for electric motors in combination, a pair of electromagnetically operated switches adapted to establish line connections for the motor for operation in reverse directions respectively, one of said switches being arranged to control the energizing circuit of the other switch and voluntary control means for said switches adapted to be rendered ineffective upon extraneous interruption of the energizing circuit of said former switch.

4. The combination with a conduit to be supplied with fluid under pressure, a valve for controlling the supply of fluid to said conduit and a reversible actuating motor for said valve of a pair of electro-magnetically controlled switches for effecting energization of said motor to open and close said valve selectively, one of said switches being responsive to interrupt the energizing circuit of said motor and the other being responsive to establish the energizing circuit for said motor, means controlled by said former switch for controlling the energizing circuit of said latter switch, voluntary selective control means for said switches and pressure operated means adapted to control the energizing circuit of said former switch to provide for motor actuation of said valve in one direction only upon predetermined pressure conditions in said conduit.

5. In a reversing controller for electric motors, in combination, a pair of electromagnetically operated switches adapted to effect line connections for the motor for operation in reverse directions respectively, one of said switches being biased to motor energizing position and adapted to be electromagnetically moved and held out of such position, the other of said switches being movable electromagnetically to motor energizing position and biased out of such position, said former switch being adapted to control the energizing winding of said latter switch, and voluntary selective control means for said switches adapted to be rendered ineffective upon closure of said former switch through extraneous interruption of the holding circuit of said switch.

6. The combination with a conduit to be supplied with fluid under pressure, a valve for controlling the supply of fluid to said conduit and a reversible actuating motor for said valve, of a pair of switches for effecting valve closing and valve opening energization of said motor selectively, said closing switch having an electromagnetic winding for moving and holding the same out of motor energizing position and said opening switch having a winding for effecting motor energizing positioning thereof subject to prior open positioning of said closing switch whereby interruption of the energizing circuit of said closing switch serves to effect valve closing energization of the motor and to render said opening switch unresponsive, and control means for said switches.

7. In a reversing controller for electric motors, in combination, a pair of electromagnetically operated switches adapted to effect line connections for the motor for operation in reverse directions respectively, one of said switches being biased to motor energizing position and adapted to be electromagnetically moved and held out of such position, the other of said switches being movable electromagnetically to motor energizing position and biased out of such position, and interlocking means for said switches to prevent simultaneous closure thereof.

8. In a reversing controller for electric motors, in combination, a pair of electromagnetically operated switches adapted to effect line connections for the motor for operation in reverse directions respectively, one of said switches being biased to motor energizing position and adapted to be electromagnetically moved and held out of such position, the other of said switches being movable electromagnetically to motor energizing position and biased out of such position, interlocking means for said switches to prevent simultaneous closure thereof, and voluntary selective control means for said switches adapted to be rendered ineffective upon closure of certain of said switches through extraneous interruption of the holding circuit of the same.

9. The combination with a conduit to be supplied with fluid under pressure, a valve for controlling the supply of fluid to said conduit and a reversible actuating motor for said valve, of a pair of switches for effecting valve closing and valve opening energization of said motor selectively, said closing switch having an electromagnetic winding for moving and holding the same out of motor energizing position and said opening switch having a winding for effecting motor energizing positioning thereof subject to prior open positioning of said closing switch whereby interruption of the energizing circuit of said closing switch serves to effect valve closing energization of the motor and to render said opening switch unresponsive, control means for said switches, and means controlled by the motor for limiting the operation thereof.

In witness whereof, I have hereunto subscribed my name.

EDWARD T. FOOTE.